United States Patent
Gothard

(10) Patent No.: US 7,064,672 B2
(45) Date of Patent: Jun. 20, 2006

(54) HIGH RESOLUTION DIGITAL DISPLAY SYSTEM WITH RECORDING CAPABILITY

(76) Inventor: David Gothard, 113 Colonade Cir., Naples, FL (US) 34103

(*) Notice: Subject to any disclaimer, the term of this patent is extended or adjusted under 35 U.S.C. 154(b) by 0 days.

(21) Appl. No.: 10/705,113

(22) Filed: Nov. 10, 2003

(65) Prior Publication Data

US 2004/0095339 A1    May 20, 2004

Related U.S. Application Data

(63) Continuation-in-part of application No. 10/447,728, filed on May 28, 2003, which is a continuation-in-part of application No. 10/010,556, filed on Nov. 8, 2001, now abandoned, which is a continuation-in-part of application No. 09/295,894, filed on Apr. 21, 1999, now Pat. No. 6,384,736, which is a continuation-in-part of application No. 09/500,284, filed on Feb. 8, 2000, now Pat. No. 6,215,411, which is a continuation of application No. 09/132,456, filed on Aug. 11, 1998, now abandoned.

(60) Provisional application No. 60/083,597, filed on Apr. 30, 1998.

(51) Int. Cl.
*G08B 5/00* (2006.01)

(52) U.S. Cl. .................... 340/815.4; 340/815.47; 340/815.49; 340/693.5; 340/693.9; 361/683; 312/223.2

(58) Field of Classification Search ............ 340/815.4, 340/815.47, 815.49, 693.5, 693.9; 361/683; 312/223.2
See application file for complete search history.

(56) References Cited

U.S. PATENT DOCUMENTS

| | | | |
|---|---|---|---|
| 4,973,952 A | 11/1990 | Malec et al. | |
| 5,089,745 A | 2/1992 | Iannini | |
| 5,218,018 A * | 6/1993 | Tominaga et al. | ......... 523/412 |
| 5,218,629 A | 6/1993 | Dumond, Jr. et al. | |
| 5,287,266 A | 2/1994 | Malec et al. | |
| 5,289,277 A * | 2/1994 | Blanchard et al. | ......... 348/441 |
| 5,295,064 A | 3/1994 | Malec et al. | |
| 5,309,174 A | 5/1994 | Minkus | |
| 5,371,551 A * | 12/1994 | Logan et al. | ............... 348/571 |
| 5,612,741 A | 3/1997 | Loban et al. | |
| 5,761,601 A | 6/1998 | Nemirofsky et al. | |
| 5,844,181 A | 12/1998 | Amo et al. | |
| 2002/0165776 A1 | 11/2002 | Hunter | |
| 2002/0186329 A1 * | 12/2002 | Tong et al. | ................ 348/839 |

FOREIGN PATENT DOCUMENTS

| | | |
|---|---|---|
| DE | 19504923 A | 8/1996 |
| DE | 19637854 A | 3/1997 |
| EP | 0822535 A | 2/1998 |
| EP | 1244303 A2 | 9/2002 |
| FR | 2535881 A | 5/1984 |

* cited by examiner

*Primary Examiner*—Julie Bichngoc Lieu
(74) *Attorney, Agent, or Firm*—Robert J. Schaap

(57) ABSTRACT

A high resolution and high definition digital display system which is computer operated and includes a high resolution display panel in the form of a television system. A computer in the housing controls the generation of a display on the display screen with X-Y coordinate signals. The display system has digital recording capability such that a signal from a remote source can be received and recorded in digital format. The display system is also constructed so that a removable drawer containing the electronic components can be removed for servicing without the need for transport of the entire display system.

25 Claims, 3 Drawing Sheets

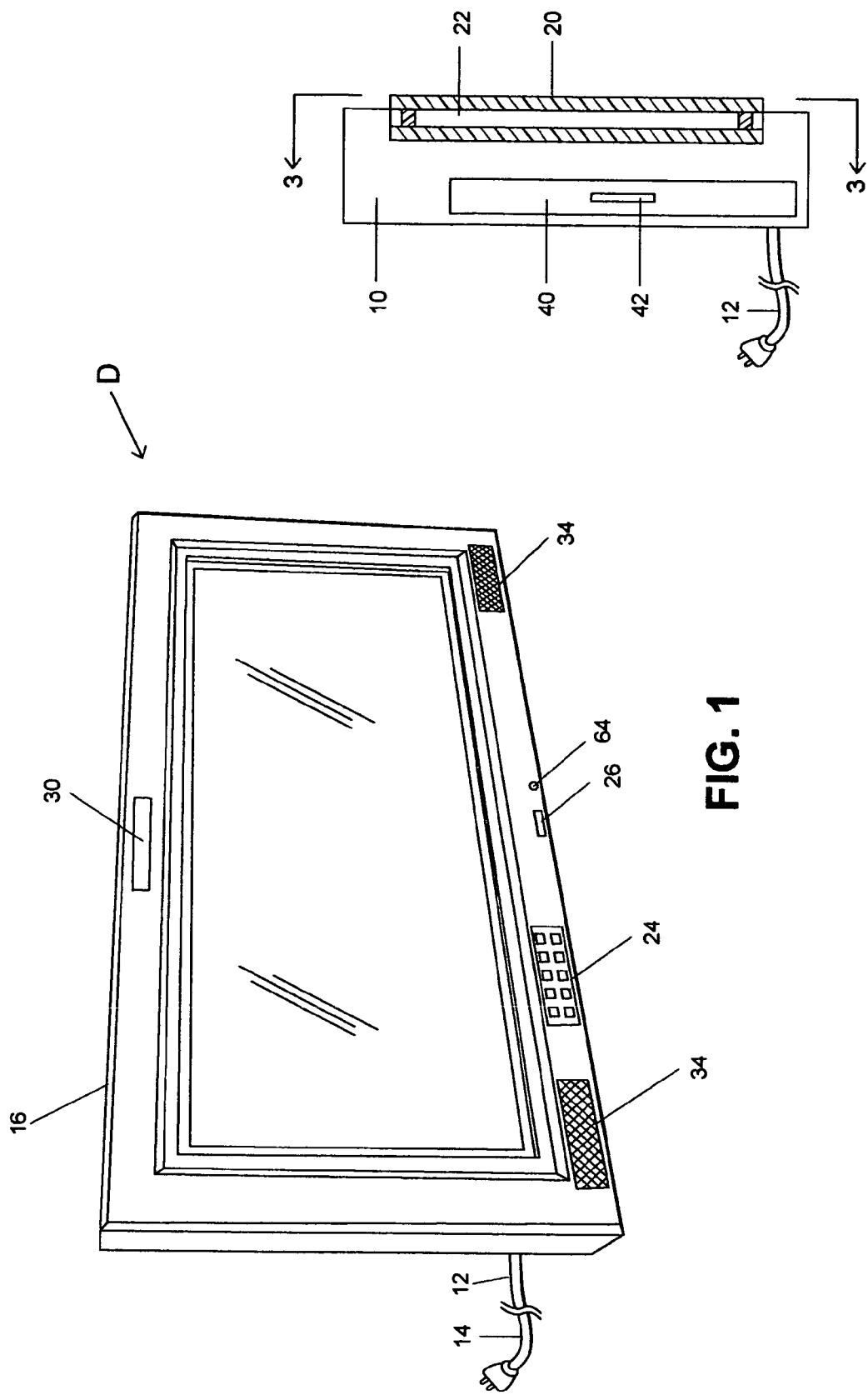

HIGH RESOLUTION DIGITAL DISPLAY SYSTEM WITH RECORDING CAPABILITY

RELATED APPLICATIONS

This application is based on and claims priority from my U.S. Provisional Patent Application Ser. No. 60/424,962, filed Nov. 8, 2002 for Digital Television. This application is also a continuation-in-part of my co-pending U.S. Utility patent application Ser. No. 10/447,728, filed May 28, 2003, for a High Resolution Computer Operated Digital Display System and which is a continuation-in-part of my U.S. Utility patent application Ser. No. 10/010,556, filed Nov. 8, 2001 now abandoned for a Remote Control Electronic Display System and which was a continuation-in-part of my U.S. Utility patent application Ser. No. 09/295,894, filed Apr. 21, 1999 for Remote Control Electronic Display System (now U.S. Pat. No. 6,384, 736 B1, dated May 7, 2002) and which was a continuation-in-part of application Ser. No. 09/500,284, filed Feb. 8, 2000 for Remote Control Electronic Display System (now U.S. Pat. No. 6,215,411 B1, dated Apr. 10, 2001 and which was, in turn, a continuation of my U.S. Utility patent application Ser. No. 09/132,456, filed Aug. 11, 1998 for a Remote Control Electronic Display System (now abandoned) and which, in turn, derived priority from U.S. Provisional Patent Application Ser. No. 60/083,597, filed Apr. 30, 1998 for Remote Control Electronic Display System.

BACKGROUND OF THE INVENTION

1. Field of the Invention

This invention relates in general to certain new and useful improvements in high resolution display systems primarily based on relatively flat high resolution display panels and particularly gas plasma operated display panels. More particularly, the invention relates to a display system in the form of a digitally operated television system and which includes digital recording capability as well as a design for improved servicing.

2. Brief Description of Related Art

Until recently, the art of broadcasting video displays primarily relied upon a raster pattern display screen with a plurality of guns located rearwardly of the screen projecting beams to the front of the screen. This type of display was used effectively and is still used effectively in radar systems and television sets and the like. More recently, there have been several improvements in display screens which rely upon light emitting diodes, such as LCD display screens, as well as other types of displays.

There had long been a desire for a relatively flat panel display screen, particularly for television systems. In the relatively recent past, that flat panel screen was actually made available by the development of a plasma operated screen. Even though the flat panel plasma operated display screen had been developed in the mid to late 1990's, it never really found its way into any television system until recently. It remained for the applicant to recognize the capability of using that plasma operated screen in a television system as embodied in the applicant's U.S. patent application Ser. No. 10/447,728, filed May 28, 2003, for a High Resolution Computer Operated Digital Display System, as well as the earlier patent applications upon which it was based. Thus, it remained for the applicant to recognize a potential and way to use that plasma screen and digitally operated display system under computer control so that the computer controlled the X-Y display on the screen.

In the immediately described pending U.S. patent application filed by the applicant, there was no real detailed system described for recording capability using digital signal broadcasts. In relatively recent years, it has been found that broadcasting of digital television signals, or otherwise, signals which are processed entirely in digital format, provides a very effective display which was not otherwise available with analog format signals. In fact, at least in the United States, after a phase out period of time, it is mandated that digital signal broadcasting will be used in place of the analog signal broadcasting which is now in use. As a result, all conventional television systems after that date, will necessarily have to operate by receiving and recreating the video display from the digital signal. In the long run, the quality of the broadcast will be superior and the capability of providing interaction with that broadcast and with the signals displayed therefrom is also enhanced.

Also in the relatively recent past, television systems with analog signal displays have been provided with an analog signal recording capability. Thus, in many modern television systems, it is possible to find a video cassette recording system in the same set as the display screen. However, and heretofore, there has not been any display system in the form of a television set which also allows for digital recording of an input video signal. This is true whether or not the signal is a broadcast signal or one which is generated from an external source. In fact, there is no presently available system which allows for recording of a digital signal video display designed for consumer use capability.

The problems of operating a digital television system were described in my aforesaid co-pending U.S. patent application Ser. No. 10/447,728, filed May 28, 2003. Among these problems were the fact that the plasma operated screens generated a large amount of heat which had to be dissipated and the fact that these types of display systems are used in a wide variety of environments which can range from relatively hot environments to fairly cold environments. The problems of effectively operating a digital television system with a digital recording capability is also even more pronounced when considering these other problems. However, the applicant did provide a way to provide a display system which would operate in the nature of a digitally operated television system and which also included capability of recording digital video signals.

In addition to the foregoing, and with plasma operated display screens, it is necessary to use a computer or sophisticated computer operated processor to produce the X-Y coordinate signal on the plasma operated screen. It again remained for the applicant to provide not only the display system, but the use of the same hardware to operate the plasma screen as well as to provide the digital recording capability.

In connection with the use of any computer system in a display system environment, given the fact that these systems are subject to some abuse, and they are used in a wide variety of environmental conditions, the components forming part of the computer system are sensitive and subject to malfunction. Particularly with large television systems, the weight is substantial and they are not capable of being readily moved for servicing. Hence, there was a need for some system to allow for servicing of a large display system without the need of transporting the entire system.

OBJECTS OF THE INVENTION

It is, therefore, one of the primary objects of the present invention to provide a digital display system which operates with a wide angle high resolution display screen and which also allows for digital recording capability.

It is another object of the present invention to provide a display system of the type stated and which is uniquely designed to form the basis of a digital television system having a digital recording capability and which is highly efficient in operation.

It is a further object of the present invention to provide a digital display system of the type stated which is capable of being used in a wide variety of environmental conditions such as, for example, hot climates and also in relatively cold climates but which does not necessarily require sophisticated environmental control systems to be used in conjunction therewith.

It is an additional object of the present invention to provide a digital display system of the type stated in the form of a television system and which includes a pull-out drawer or tray allowing servicing of the electrical components forming part of that system without the need to transport the entire system.

It is also an object of the present invention to provide a digital display system of the type stated which is uniquely constructed so that certain of the components used for the operation of the display screen can be shared and also used for operation of the recording system forming a part thereof.

It is another salient object of the present invention to provide a method for generating a display of a video signal from a source thereof and for also allowing for recording of that video signal in a digital format or for recording of a digital signal from another source thereof.

It is still a further object of the present invention to provide a method of operating a digital display system using a computer controlled display screen for control of the X-Y coordinate display on the screen as well as for operating a recording system to record material which may be displayed or which may merely be transmitted to the display system.

With the above and other objects in view, my invention resides in the novel features of form, construction, arrangement and combination of parts and components presently described and pointed out in the claims.

SUMMARY OF THE INVENTION

The present invention, in broad terms, relates to a self-contained digitally operated display system which employs a high resolution display screen capable of having photons controlled through X-Y coordinate axes from a computer, along with a digital recording capability. In particular, the display screen is operated by a computer station, preferably mounted within the housing of the display apparatus and which computer controls the energization of photons in the display and also controls the location of energization of such photons.

One of the important facets of the present invention is the fact that the display system also includes a capability of recording broadcast signals or other signals in digital format. Thus, the display system would include a suitable recording device and, perhaps, memory sufficient to retain any recorded transmissions including, for example, a CD-ROM and, potentially, a hard drive.

In this respect, it should be understood that the display system of the invention will receive a signal in the form in which it is broadcast, whether that be analog or digital format, and thereafter have the capability of converting that signal to the digital format if it is transmitted in a non-digital format. In this way, the entire system will be effectively digitally operated and will enable receipt of digital signal broadcasts and other digital signal inputs or, for that matter, other non-digital signal inputs which are thereafter converted.

Also in a broad sense, the display screen not only is high resolution, it also has a wide angle of viewing with essentially little or no distortion at essentially any angle of view. In a preferred embodiment, the display screen is a plasma operated display screen. One of the preferred plasma screens is hereinafter described in more detail. However, any plasma screen may be used. Also, in another embodiment of the invention, any high resolution display screen having a wide viewing angle with a high degree of resolution can be used to the extent that it is digitally controlled. In this respect, and as indicated, the control over the plasma display screen would be derived from a computer. Moreover, by definition, the display screen and hence the entire display device is relatively thin in cross-section. Hence, the display screen would conform to the solution to a demand for a high resolution digitally operated relatively thin television display.

As indicated previously, the computer controls the basic operation of the display screen as well as any of a variety of systems which can be connected to the display system. The computer can therefore be relatively simple as long as the computer is only designed to control the operation of the display and perhaps selection of channels and the like. However, with respect to other functions which may be added to the digitally operated display system, the computer would have additional input/output functions and hence the computer itself would be more complex from a standpoint of the operations to be performed.

The computer is operated in conjunction with some receiver associated with the plasma operated display screen for receiving signals from a remote source. Usually, the receiver is a wireless receiver so that signals are sent by wireless communication, e.g., broadcast signals and for that matter, signals bounced from satellite dished and the like. However, the present invention also contemplates the use of a receiver which is effectively hardwired to the remote source for directly delivering signals to the computer. To this extent, the signals which are transmitted from this remote source are hereinafter referred to as "electronic signals". Moreover, and although the signals could be transmitted in analog format, and ultimately converted to digital format, the signals may preferably be transmitted in the digital format to the extent possible.

The display system may be relatively thin, as aforesaid, and contains those basic components necessary for the operation of the system. Obviously, one of the basic components is a display panel. One of the components operated in connection with the display panel would be a motherboard which constitutes one of the important components of the computer. This may be used in conjunction with a so-called "daughter board" which operates with a video processor, sometimes referred to as a video translator. The display system would include an outer housing having an interior compartment for location of the operating components therein.

An opening would be formed in the housing along one side for the display panel. Preferably, the display panel is protected by a transparent cover sheet. In addition, the computer would be operated by an internal power supply for controlling power both to the computer and to the display panel.

In a preferred embodiment, separate power supplies are provided for operation of the display panel with one being dedicated to operation of the display panel and the other being dedicated to operation of the computer and other circuitry components. Power regulators can also be used in conjunction with or form part of the power supply or supplies. The display system is capable of receiving broadcast signals and essentially any form of wireless signal, as well as telephonic signals, and in which case a modem would normally be employed. However, the display system is also capable of receiving signals over any hardwire communication link.

For purposes of digital recording of broadcast signals or other input signals, the system of the invention will include a suitable recording device, as well as an extra memory, such as a CD-ROM, and which is connected to the hard drive operating with the motherboard. In addition, tuner circuits may also be used for receiving cable input signals, HD signals and the like. A satellite antenna could be used in order to pick-up any satellite signals which are then introduced into the tuner circuits.

The display system of the invention is also capable of receiving other types of broadcast signals or other introduced signals which are capable of being recorded and addressed for play-back. Thus, for example, a recorder/player, such as a VCR or laser disc player or other video source, may form part of the system of the invention or, otherwise, it may be connected to the system of the invention. Further, it is even possible to use a digital camera connected to the display system so that the digital photograph may be taken for purposes of display.

The exact size and type of the modem will vary depending upon the particular operation of the digital display system. Moreover, a memory section is associated with the motherboard. This memory section could be advantageously employed inasmuch as it is capable of digitally storing transmitted display signals which can be presented at a later time. Other storage capabilities are also provided by the storage section. Thus, computer routines enabling presentation of games and, for that matter, even interactive operations, can be stored in this main storage. The main storage preferably operates in conjunction with the motherboard, although it could operate in conjunction with the daughterboard as well.

The display system would also include one or more speakers for audio presentation. These speakers would be connected to the video processor. In addition, the motherboard and even the storage therefor could potentially be connected to an audio receiver and amplifier which is frequently referred to as an "IDU". In like manner, the motherboard and for that matter even the video processor could be connected to a computer storage which is frequently referred to as an ATX. The purpose of the ATX is to receive and store audio visual broadcast material for presentation at a later time.

For purposes of environmental control, the housing of the display system would include one or more fans. These fans would be suitably operated from the main power source to the display system. Although other types of environmental control can be used, it has been found that the fans are sufficient for this purpose.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 3:
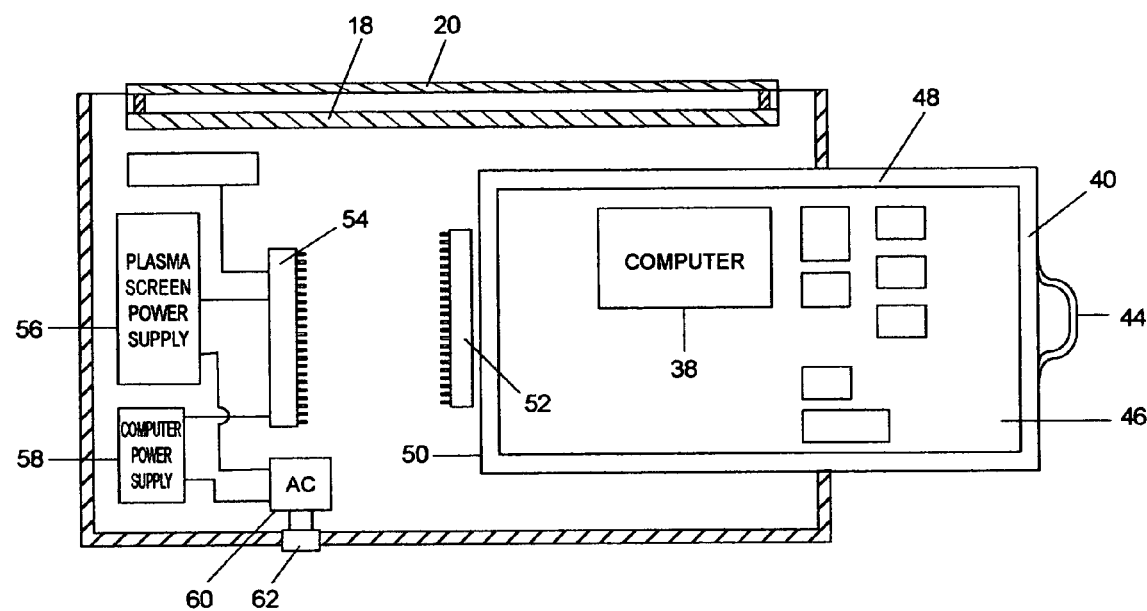
Figure 4:
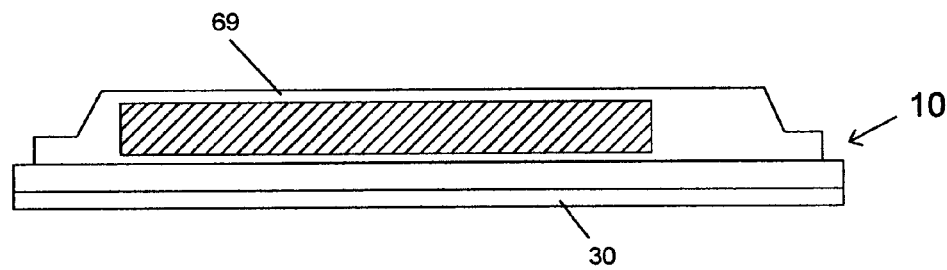
Figure 5:
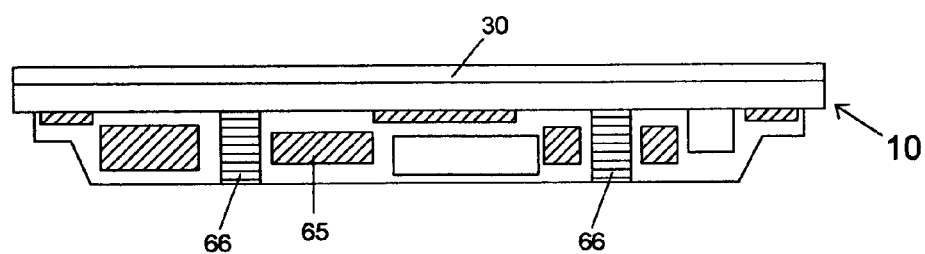

Having thus described the invention in general terms, reference will now be made to the accompanying drawings in which:

FIG. 1 is a perspective view of the display system constructed in accordance with and embodying the present invention;

FIG. 2 is a side elevational view, partially broken away and in section, of the display system of FIG. 1;

FIG. 3 is a top plan view of a removable drawer housing some of the major electronic components of the invention and which is taken substantially along the plane of line 3—3 of FIG. 2;

FIG. 4 is a top plan view of the display system;

FIG. 5 is a bottom plan view of the display system; and

Figure 6:
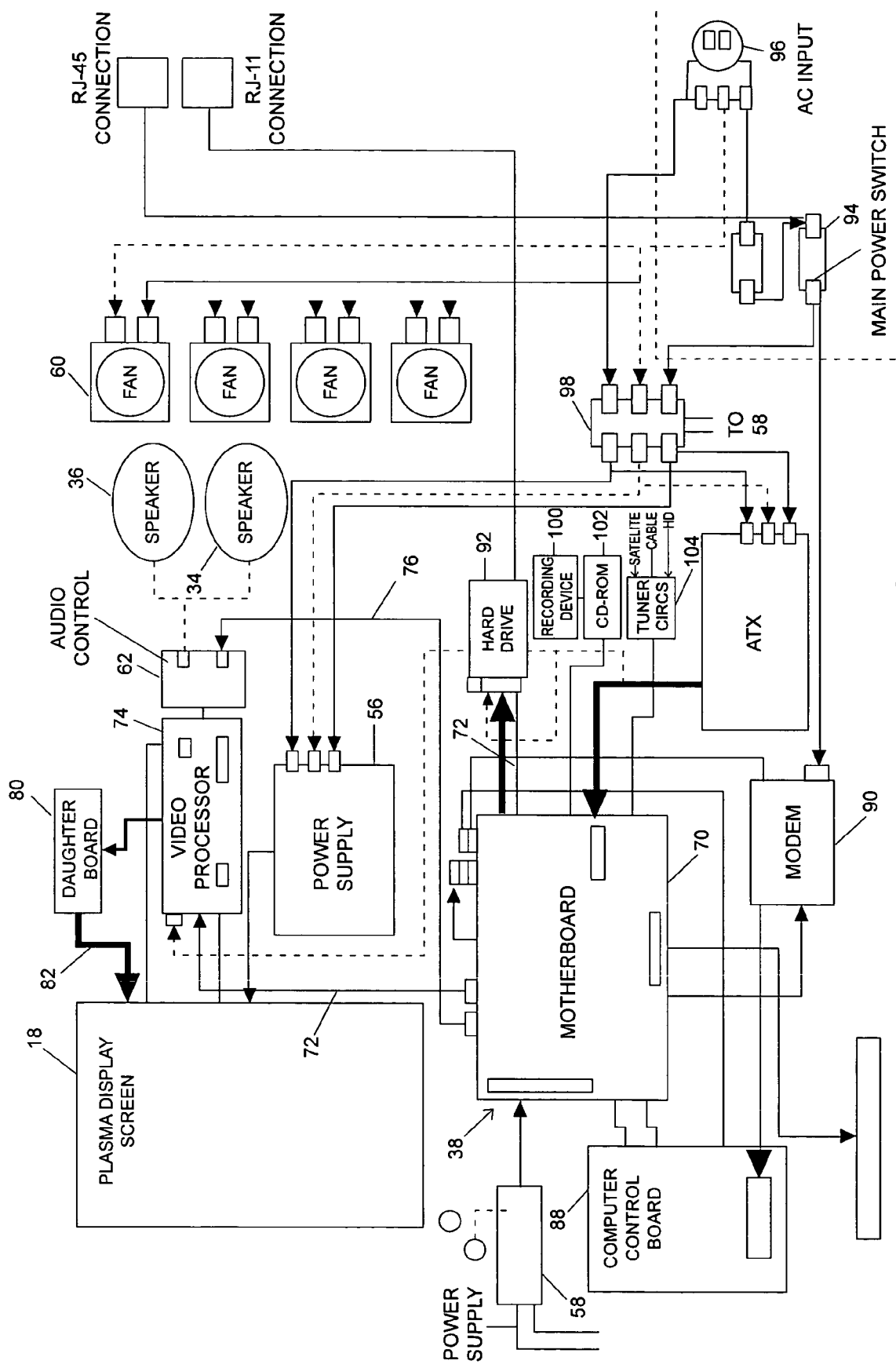

FIG. 6 is a schematic block diagram showing some of the major components of the digital display system of the present invention.

DETAILED DESCRIPTION OF A PREFERRED EMBODIMENT

Referring now in more detail and by reference characters to the drawings, which illustrate a preferred embodiment of the present invention, D designates a digital display system in accordance with the present invention. The display system of the illustrated and described embodiment employs a self-contained and dedicated computer along with a plasma operated display screen, all as hereinafter described in more detail.

The display system, sometimes referred to as a "display device" generally comprises an outer housing 10 which is relatively flat in cross-sectional thickness. This display system includes an electrical conductor 12 having a plug 14 at an outer end for connection to a suitable source of electrical power for operation.

The housing 10 is provided with a front panel 16 having an opening for allowing viewing of a display screen 18, as shown in FIG. 6. The display screen 18 is preferable covered by a relatively rigid and highly durable transparent protective sheet 20. In a preferred embodiment, the transparent sheet 20 may be formed of a durable relatively scratch-resistant plastic material. One such material which can be used and which retains its transparency for a long period of time is that polycarbonate offered under the name and mark "Lexan". In actual construction, there exists a slight air gap 22 between the display screen 18 and the protective panel 20, as best seen in FIG. 2 of the drawings. Beyond this, the protective panel could be connected to the display screen as a unitary component. Otherwise, the panel could be merely fitted in the opening on the front of the housing 10.

The display screen 18 is preferably a plasma operated display screen, as aforesaid. However, other suitable high resolution display screens may be used, including such as an organic crystal display or for that matter an organic luminescent display. Further, an inorganic luminescent display could also potentially be used as the display screen in the apparatus of the invention.

The display screen is preferably made with a slightly thickened peripheral edge so as to obtain a generally uniform display thickness. One of the preferred types of display screens is that made by Toshiba. These display units are relatively thin and have a thickness in the order of about 35 mm. One of the preferred forms of display panel is made by Fujitsu and is identified as a "Full Color Plasma Display". These displays effectively operate as high-definition direct-view television monitors.

These displays generally contain about 640 horizontal display pixels and about 480 vertical pixels along with about 1920 horizontal display cells and 480 vertical display cells. Moreover, they operate with gradations of red, green and blue and present a viewing angle of about 140°. Internally, the display is usually comprised of an IF controller, a data controller, a random access memory, and a driver controller. Nevertheless, since the plasma display is available in the art, it is therefore neither illustrated nor described in any further detail herein.

Also mounted on the housing 10 is a control panel 24 containing control switches for operation of the digital display system. These control switches may preferably be in the form of push button switches although other types of control switches could be used. The control switches would include for example, channel selection switches as well as off-on switches and volume controls. In addition, and for users who prefer a degree of sophistication, other controls for controlling the operation of the computer or for that matter the memory may also be made available. In addition, the control panel could be a plurality of individual control panels although only one has been shown for purposes of clarity.

The control panel 24 may also include other control switches which would be provided for initiating and conducting a recording operation. Thus, the control panel would include inputs for determining whether the signal introduced to the display system is from a satellite or cable input or other type of input and would provide for proper operation of the recording system depending upon the type of input. In addition, the push button control switches may also include various functions to enable the play of a recorded signal, the fast forwarding, fast reversing and like functions.

A digital read-out device 26 may also be mounted on the front of the housing 10. This digital read-out device may preferably be in the form of a numerical read-out device presenting, for example, such information as channel selection, volume levels and the like. Obviously, if desired, a more sophisticated type of read-out device could be employed if desired.

Speakers 34 are connected to the audio amplifier (not shown) other than an ATX unit, forming part of the audio circuit of this system. Connection may be either by hard-wires or, for that matter, they may be connected by means of non-wire communication to the audio amplifier. In this way, the speakers 34 could be constructed to be removable from the housing and located elsewhere in a room of use for the desired sound effects.

One of the important factors of the present invention is the fact that the entire digital television is operated by a computer 38 which controls the operation of the plasma operated screen. Control is achieved by energization of pixels on the screen through a coordinate X-Y pattern. The screen is actually controlled through a program which may be embedded into a memory or otherwise, it can be introduced by means of a software program. A video processor circuit, sometimes referred to as a translator circuit, could also be employed as a dedicated computer and would replace the need for an actual computer per se. However, this dedicated video card would be provided with the proper input-output signals. Moreover, the video card could operate in conjunction with a separate memory, or it may contain its own memory, as well as a small processor, along with the embedded software therefore. Thus, the computer in any form, will operate both the display screen and provide for all of the necessary video recording and playback functions which use digital video signals.

In one of the important aspects of the invention, the computer is actually dedicated and self-contained. In other words, the computer can be a stand-alone device which is mounted within the housing. Moreover, it is dedicated only to the operations of the display system. Although the computer is preferably mounted directly within the housing, there are situations in which the computer could be physically located beyond the housing, that is, not directly mounted within the housing or for that matter, even physically secured to the housing. In these cases, the computer would be electrically connected to the other major operating components of the digital display system which are hereinafter described. Thus, as a simple example, the display system could be mounted on a wall and the computer could be mounted on the other side of that wall and electrically connected to the operating components of the digital display system. The computer itself may also be used for the operation of any peripheral components which may be connected to the display system.

The computer housing is also provided on one of its side faces with a drawer 40 having an engageable handle 42, as best shown in FIGS. 2 and 3 of the drawings. The drawer 40 contains the electronic components in a manner as hereinafter described in more detail and is capable of being pulled outwardly with respect to the housing as, for example, in the manner as shown in FIG. 3. Moreover, it is capable of being completely removed from the housing for purposes of servicing the electronic components.

In the modern computer systems, there is a reasonable likelihood that any electronic failure could occur in the control circuitry, as hereinafter described, including the computer and recording circuitry as opposed to the hard wired conventional components, such as the environmental control system. Since some of these display systems may be relatively heavy and not readily transportable, it would be convenient to be able to service all of the electronic components without need for the entire cabinet and display screen. Moreover, since the plasma display screens and, for that matter, some of the electronic display screens are fairly fragile, it would be desirable to avoid moving the entire display system and to only remove the electronic components for servicing.

In accordance with the present invention, the electronic components will be mounted within the removable drawer and, hence, the drawer can be removed for this purpose without otherwise engaging in an entire removal of the cabinet or other parts of the display system. By reference to FIG. 3, it can be observed that the drawer 40 is provided with a bottom wall 46 and a pair of longitudinal side walls 48 as well as a rear wall 50. Mounted on the rear wall 50 is a connector strip 52 which is engageable with another mating connector strip 54 when the drawer is completely inserted into the housing. When the drawer is pulled out of the housing as, for example, to the position as shown in FIG. 3, there is complete disconnection of the electrical components from the connector strip 54. However, when the drawer is pushed back into the housing there will be an automatic reconnection in such manner that the entire display system will be operable.

By further reference to FIG. 3, it can be observed that the connector strip 54 mounted within the bottom of the housing is also electrically connected to a pair of power supplies 56 and 58. In this case, the power supply 56 is designed for operation of the plasma display and a separate power supply 58 is provided for operation of the electronic components and, particularly, the computer 38. However, it should be understood that a single electronic power supply could be used, if desired.

The housing 10 is also provided with an AC input circuit 60 having an outlet junction box 62 for which an electrical cable, such as the cable 12, may be connected. The AC circuit may include any other necessary components, such as filtering circuits or the like.

In accordance with this construction, it can be seen that those components in which there is a very low failure rate are mounted directly within the housing 10. Those components which could be subjected to a higher failure rate or have a greater need for servicing would be mounted within the removable drawer 40.

The housing would also include an audio controller 62 which would control the audio portion of any broadcast or other display. The audio controller would include suitable audio amplifiers as well as gain controls and the like. Moreover, this audio controller 62 would be connected to the various speakers such as the speakers 34.

In addition, the housing may also be provided on a side portion thereof with a connector board. In this way, various auxiliary external components could be releasably connected to the display system by means of cables ending with jack connectors or the like.

It is also possible to display photographs taken through a video camera. For this purpose, a video camera could be provided with a jack for connection to the display system. In addition, additional computers could also be connected to the display system.

The housing may also be provided with a remote control sensor 64 on the front surface thereof. This remote control sensor would be connected to the controller in the housing for both video and audio control in response to actuation of a remote control device. As indicated previously, it is important to insure that there is some type of environmental control in connection with the operation of the display system. For this purpose, it has been found that blower fans are usually effective for that. Thus, the apparatus may be provided at its lower face with inlet blower fans 66 for introducing cooling air into the interior of the housing 10. Moreover, the air which is introduced would be blown past the display panel for cooling of same. An additional air inlet 68 could also be provided on the bottom of the housing in the manner as shown in FIG. 5 for enabling a circulation of air even in the absence of the use of the blower fans 60. Finally, the housing would be provided on its upper end with an exhaust port 69, as shown in FIGS. 3 and 4 of the drawings.

The major components forming part of the electrical arrangement of the display system are more fully illustrated in FIG. 6 of the drawings and comprises the pair of power supplies 56 and 58. By observation of FIG. 6, it can be observed that the power supply 56 primarily serves the plasma display screen 18 as well as certain of the operating components associated with the plasma display screen. The power supply 58, on the other hand, serves the computer, such as the motherboard 38 along with a computer control board 88, as hereinafter described.

The display system further comprises a motherboard 70 which constitutes one of the major components of the display system electronics and constitutes one of the major components of the computer 38. The motherboard 70 effectively provides a video output, in the form of a VGA output signal 72, to a video transport or video processor 74. The motherboard 70 also provides an audio output 76 introduced into the audio controller in the form of an audio control board 62. Thus, the motherboard 70 essentially provides both the video and the audio outputs which ate used in the display screen 18.

The audio control board 62 is connected to the video processor or video translator 74 in the manner as shown in FIG. 6. Moreover, the video translator 74 provides an output to a daughterboard 80 which is, in turn, provided with the audio and video inputs combined at 82 into the display screen 18. The motherboard 70 is connected to and receives a major input from a computer storage and controller, commonly referred to as an ATX PC unit over an input line 86. The motherboard 70 also provides an output to a hard drive interface, commonly referred to as an IDEE and which, in turn, is connected to an RJ-11 connector.

The circuitry is further provided with a computer control board 88 having an input from the motherboard 70 and which also has outputs to the motherboard 70. One of those outputs is an ethernet output and the other is a USB-1 output. Further, the circuitry is provided with a modem 90 for receiving input signals carried over telephone communication links. The modem 90 is also connected to the motherboard 70 in the manner as shown and is further connected to the computer control board 88.

The overall major circuitry is further provided with one or more main power switches 94 which receives power from an AC input 96. The AC input and the main power switch are connected across a relay 98 and the latter of which provides electrical power to many of the components in the circuitry and particularly the power supply 40.

For purposes of providing for recording of signals introduced into the display system, there is provided a conventional recording device 100 along with a memory as, for example, a CD-ROM 102. It can be observed that each of these devices are connected to the hard drive and then to the motherboard. In this case, the recording device could be used for recording signals broadcast to and received by the display system.

It is also possible to use one or more tuner circuits 104 for receiving satellite signals, cable signals or other HD signals. In this case, the tuner circuit is also connected directly to the motherboard 70. If desired, the tuner board could be connected to the CD-ROM 102 and then to the motherboard, as may be desired.

In accordance with the above-identified construction, it can be observed that any digital type signal can be recorded. Even if the signal introduced is an analog signal, it can be converted to an equivalent digital signal and thereafter recorded.

Thus, there has been illustrated and described a unique and novel high resolution and high definition computer operated digital display system and which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

The invention claimed is:

1. A digital display system with improved servicing ability and internal recording capability for playing and recording digital signal broadcasts, said display system comprising:
   a) an outer housing;
   b) a high resolution relatively flat panel display screen in said housing for presenting a visual image thereon;
   c) a drawer shiftable into and out of said housing and being removable from said housing;
   d) a substantial portion of the computer means and electronic circuitry necessary for operation of said display screen and for controlling operation of same fully located in said drawer, said computer means and electronic circuitry in connection therewith mounted on said removable drawer such that said drawer can be opened and removed from said housing for allowing servicing of said computer means and the circuitry associated therewith without the necessity of moving the entire display system;
   e) signal receiving means associated with said housing being operatively connected to said computer means and circuitry for receiving an electronic signal from a remote source to enable generation of a display on said display scrren; and
   f) said drawer being configured so that when fully inserted into said housing circuitry connection can be established between said display panel and said computer means and the electrical circuitry associated therewith.

2. The digital display system of claim 1 further characterized in that said display system further comprises:
   a) a hard drive and a located in said housing and being operatively connectable to said computer means or electronic circuitry when said drawer is inserted into said housing.

3. The digital display system of claim 2 further characterized in that said display system further comprises:
   a) a tuner circuit operatively connected to said computer means and having inputs for receiving a satellite signal and a cable signal.

4. The digital display system of claim 2 further characterized in that said display system further comprises:
   a) memory means operatively connected to said computer means and receiving an input from said computer means for further storing information therein.

5. The digital display system of claim 2 further characterized in that said display system further comprises:
   a) a memory means separate from the hard drive and which receives external signals for recording and retention thereof.

6. The digital display system of claim 1 further characterized in that:
   a) said high resolution flat panel display screen is a plasma operated display panel.

7. A digital display system having improved servicing capability which enables servicing without transporting of the entire display system, said display system comprising:
   a) an outer housing;
   b) a high resolution relatively flat panel display screen on said housing and capable of generating images observable to a viewer;
   c) a drawer shiftable into and out of said housing and being removable from said housing; and
   d) computer means and electronic circuitry and components in connection therewith operatively connected to said display panel for controlling operation of same, a substantial portion of said computer means and electronic circuitry being mounted on said shiftable drawer, such that said drawer can be opened and electronically disconnected from and removed from said housing with only a relatively small number of electronic components remaining in said housing thereby allowing for servicing of said computer means and the electronic circuitry associated therewith without the necessity of moving the entire display system.

8. The digital display system of claim 7 further characterized in that:
   a) a connecting means is mounted within said housing and a corresponding connecting means is operatively mounted on said drawer such that the electronic components in said drawer can be connected to the display screen when said drawer is fully inserted into said housing.

9. The digital display system of claim 7 further characterized in that:
   a) a bayonet type connecting means is mounted within said housing and a corresponding bayonet type connecting means is operatively mounted on said drawer such that the electronic components in said drawer are automatically connected to the display screen when said drawer is fully inserted into said housing.

10. The digital display system of claim 7 further characterized in that said display system further comprises:
    a) power supply means operatively mounted within said housing and being connectable to the electronic components in said drawer when said drawer is inserted into said housing.

11. The digital display system of claim 7 further characterized in that:
    a) a first power supply is provided for connection to said display screen and a second power supply is provided for connection to said computer means, said power supplies being operatively mounted within said housing.

12. The digital display system of claim 7 further characterized in that the electronic components mounted on said drawer comprise a computer control board, a motherboard, a video processor and an audio control.

13. The digital display system of claim 12 further characterized in that a recording device is also operatively mounted on said drawer and is operable with a CD-ROM mounted on said drawer.

14. A method of servicing a digital display system comprising an outer housing, a display panel on said housing and capable of generating images which are observable to a viewer, and a removable drawer containing electronic components and circuitry for operating the display panel, thereby eliminating the need for transporting the entire system to a service location for servicing, said method comprising:
    a) removing the drawer from the housing and disconnecting the electronic components in the drawer from the display panel;
    b) allowing for servicing of the electronic components in said drawer; and
    c) reinserting said drawer back into the housing and automatically electrically reconnecting the electronic components to the display panel.

15. The digital display system of claim 1 wherein the electronic signal is a broadcast signal, a satellite signal, a cable signal, a video signal.

16. The digital display system of claim 1 wherein the electronic signal received is an analog signal and the system is able to convert the analog signal to a digital format prior to recording.

17. The digital display system of claim 7 wherein the removable drawer is secured to and forms a part of the outer housing when inserted back into said housing.

18. A digital display system having improved servicing capability which enables servicing without transporting of the entire display system, said display system comprising:
   a) an outer housing;
   b) a high resolution relatively flat panel display screen;
   c) a drawer shiftable into and out of said housing and being removable from said housing;
   d) a display panel on said housing and capable of generating images which are observable to a viewer; and
   e) computer means and electronic circuitry in connection therewith in close proximity to and being operatively connected to said display panel for controlling operation of same, a substantial portion of said computer means and electronic circuitry being mounted on said shiftable drawer, such that said drawer can be opened and electronically disconnected from and removed from said housing with a relatively small number of electronic components remaining in said housing thereby allowing for servicing of said computer means and the electronic circuitry associated therewith without the necessity of moving the entire display system; and
   f) said drawer being configured so that when fully inserted into said housing circuitry connection can be automatically established between said display panel and said computer means and the electronic circuitry associated therewith without need for manual intervention.

19. The digital display system of claim 2 further characterized in that:
   a) a connecting means is mounted within said housing and a corresponding connecting means is operatively mounted on said drawer such that the electronic components in said drawer can be connected to the display screen when said drawer is fully inserted into said housing.

20. The digital display system of claim 18 further characterized in that:
   a) a bayonet type connecting means is mounted within said housing and a corresponding bayonet type connecting means is operatively mounted on said drawer such that the electronic components in said drawer are automatically connected to the display screen when said drawer is fully inserted into said housing.

21. The digital display system of claim 7 further characterized in that said display system further comprises:
   a) power supply means operatively mounted within said housing and being connectable to the electronic components in said drawer when said drawer is inserted into said housing.

22. A digital display system having improved servicing capability which enables servicing without transporting of the entire display system, said display system comprising:
   a) an outer housing;
   b) a high resolution relatively flat panel display screen;
   c) an electronic circuitry containing partial enclosure and having the electronic circuitry and components necessary for operation of said display screen;
   d) computer means and electronic circuitry in connection therewith, being connectable to said display panel for controlling operation of same;
   e) said computer means and electronic circuitry and components being located on said partial enclosure, said partial enclosure being normally disposed in close proximity to said housing and having the circuitry and components and computer means in electronic connection to said display panel, and also being disconnectable from and removable from the close proximity; and
   f) said partial enclosure being electrically disconnectable from and removed from the position of close proximity to said housing with only a relatively small number of electronic components remaining in said housing, thereby allowing for servicing of said computer means and the electronic circuitry associated therewith without the necessity of moving the entire display system.

23. The digital display system of claim 22 further characterized in that said high resolution flat panel display screen is a plasma operated display panel.

24. The digital display system of claim 22 further characterized in that:
   a) a connecting means is mounted within said housing and a corresponding connecting means is mounted within said housing and a corresponding connecting means is operatively mounted on said drawer such that the electronic components in said drawer can be connected to the display screen when said drawer is fully inserted into said housing.

25. The digital display system of claim 22 further characterized in that:
   a) a bayonet type connecting means is mounted within said housing and a corresponding bayonet type connecting means is operatively mounted on said drawer such that the electronic components in said drawer are automatically connected to the display screen when said drawer is fully inserted into said housing.

* * * * *

UNITED STATES PATENT AND TRADEMARK OFFICE
CERTIFICATE OF CORRECTION

PATENT NO. : 7,064,672 B2  Page 1 of 1
APPLICATION NO. : 10/705113
DATED : June 20, 2006
INVENTOR(S) : David Gothard It is certified that error appears in the above-identified patent and that said Letters Patent is hereby corrected as shown below:

On the cover page, Items (60) and (63) of the Related U.S. Application Data should read as follows:

(63) Continuation-in-part of application No. 10/447,728, filed May 28, 2003, now abandoned, which claimed the benefit of Provisional Patent Application No. 60/384,221, filed May 29, 2002 and is a continuation-in-part of USSN 10/010,556, filed on November 8, 2001, now abandoned, which is a continuation of application No. 09/295,894, filed on April 21, 1999, now US 6,384,736, which is a continuation-in-part of application No. 09/132,456, filed on August 11, 1998, now abandoned.

(60) Provisional application No. 60/083,597, filed on April 30, 1998 and Provisional application No. 60/424,962 filed on November 8, 2002

Column 1, lines 6 through 28, should read as follows:

This application claims the benefit of Provisional application No. 60/424,962, filed November 8, 2002. This application is also a continuation-in-part of application No. 10/447,728, filed May 28, 2003, now abandoned, which claimed the benefit of Provisional Patent Application No. 60/384,221, filed May 29, 2002 and which is a continuation-in-part of USSN 10/010,556, filed on November 8, 2001, now abandoned, which is a continuation of application No. 09/295,894, filed on April 21, 1999, now US 6,384,736, which is a continuation-in-part of application No. 09/132,456, filed on August 11, 1998, now abandoned, which claimed the benefit of Provisional Patent Application number 60/083,597, filed on April 30, 1998.

Signed and Sealed this

Seventeenth Day of August, 2010

David J. Kappos
*Director of the United States Patent and Trademark Office*